United States Patent [19]

Hang et al.

[11] 4,306,348

[45] Dec. 22, 1981

[54] METHOD OF JOINING A SUSPENSION OR FASTENING DEVICE WITH A FOLDER OR THE LIKE

[75] Inventors: Eberhard Hang, Göppingen; Matthias Kastl, Göppingen-Holzheim, both of Fed. Rep. of Germany

[73] Assignee: Constantin Hang GmbH & Co., Fed. Rep. of Germany

[21] Appl. No.: 115,075

[22] Filed: Jan. 24, 1980

Related U.S. Application Data

[62] Division of Ser. No. 964,382, Nov. 28, 1978, Pat. No. 4,262,404.

[30] Foreign Application Priority Data

Nov. 29, 1977 [DE] Fed. Rep. of Germany ....... 2753123

[51] Int. Cl.[3] .............................................. B23P 11/00

[52] U.S. Cl. ..................................... 29/432.2; 29/788; 29/816

[58] Field of Search ..................... 29/432, 526 R, 429, 29/432.2, 243.53, 788, 798, 816; 227/40, 43, 50

[56] References Cited

U.S. PATENT DOCUMENTS

| | | | |
|---|---|---|---|
| 2,053,490 | 9/1936 | Novick | 29/432.2 |
| 2,313,609 | 3/1943 | Wright | 29/432 UX |
| 2,328,821 | 9/1943 | Lyon | 29/432 UX |
| 3,200,487 | 8/1965 | Fluke | 29/432 UX |
| 3,571,892 | 1/1969 | Levy | 29/243.53 X |
| 3,588,995 | 6/1971 | Schoepe et al. | 29/788 X |
| 3,747,193 | 7/1973 | Gregory | 29/243.53 |
| 3,766,626 | 10/1973 | Mjos et al. | 29/788 X |
| 3,800,401 | 4/1974 | Jesevich et al. | 29/432.2 |
| 3,948,427 | 4/1976 | Claydon et al. | 29/432 X |

*Primary Examiner*—Charlie T. Moon

*Attorney, Agent, or Firm*—McGlew and Tuttle

[57] ABSTRACT

A riveting device for joining a suspension or fastening device, particularly a ring mechanism, to a folder, comprises, a holder for positioning a folder in vertical alignment with a fastening device and below riveting means which is capable of moving through the fastening device and the folder to rivet them together. The support structure includes a lifting element engageable with one of the folder or the fastening device to move it relative to the other below the riveting means and into interengagement in a position for it to be riveted from the opposite side by the riveting device. With the invention, either the folder or the fastening device is arranged one over the other and below a riveting head and a lifting element is disposed to engage with the lower one of the two elements and move it upwardly into engagement with the other in a position to receive the rivet from the rivet head.

3 Claims, 7 Drawing Figures

METHOD OF JOINING A SUSPENSION OR FASTENING DEVICE WITH A FOLDER OR THE LIKE

This is a division of application Ser. No. 964,382 filed Nov. 28, 1978 now U.S. Pat. No. 4,262,404, issued Apr. 21, 1981.

FIELD AND BACKGROUND OF THE INVENTION

This invention relates to devices for joining two parts together in general and, in particular, to a new and useful riveting device for joining a suspension device or stitching mechanism with a folder and to a method of joining the devices together.

DESCRIPTION OF THE PRIOR ART

The invention relates to a riveting device for joining a suspension device or fastening device, particularly a ring mechanism, with a folder or the like. The fastening device, particularly a ring mechanism, for so-called ring binders, ring folders or files, is riveted on the folder. Suspension devices, particularly those made of plastic, are also riveted on folders and files or the like, or they are fastened by eyelets. It is therefore necessary to insert the folder and the suspension device or fastening mechanism into the riveting device. When both the folder and the fastening or suspension device are aligned, they are preferably joined by two rivets. The insertion and alignment are time-consuming operations, which considerably increase the manufacturing costs of these suspension files, conventional files, ring binders or folders. In addition, this is a relatively monotonous job which requires trained personnel.

SUMMARY OF THE INVENTION

The present invention provides a riveting device for joining a suspension or fastening device, particularly a ring mechanism, with a folder, etc., by means of which the riveting can be both simplified and accelerated. The same holds true for the fastening by means of eyelets, etc.

For the solution of this problem, the invention suggests a riveting device of the above-mentioned type which is characterized by two superposed holding means for the folder, on the one hand, and the suspension device or fastening mechanism, on the other hand, as well as a lifting means for at least one of the parts to be riveted with each other. When a folder, etc., and a suspension device or fastening mechanism, hereinafter referred to only as the fastening mechanism, are in the correct position in their holding means, the lifting means is actuated to make the two parts bear on each other. Preferably, only one part is moved toward the other and it is advisable to lift the bottom part. A downward movement of the lifting means is not excluded, however.

By introducing the folder or the like and the fastening mechanism in different planes, this operation can be carried out very rapidly, without the two parts getting into each other's way, and this permits the above-mentioned sequence of operations. The invention also comprises a device for handling eyelets, etc., but only the terms "riveting device" and "riveting" will be used herein for the sake of simplicity.

A particularly preferred embodiment of the invention provides for arranging the holding means for the fastening mechanism under that for the folders etc., and designing the lifting means to lift the ring mechanisms. The latter can be lifted much more easily than the folders, while still maintaining their association with the folder, etc., because they are highly suitable by virtue of their construction for fixing and attaching corresponding holding elements of the lifting means.

A highly automated operation can be achieved, according to another feature of the invention, if the holding means are arranged on the inner end of a feeding device for the folders, etc., and the fastening mechanisms. The feeding devices should be designed in such a manner that they bring a folder or a fastening mechanism into the holding means and thus keep the following copy ready, so that it can be received by the holding means, without delay, after the riveting operation is completed and the riveted copy has been removed.

According to another feature of the invention, the feeding device has a substantially horizontal feeding part and an adjoining, downwardly inclined feeding end part, whose inner end forms the holding means for the mechanism to be riveted, or is associated directly with the latter. The fastening mechanism can be inserted into the horizontal feeding part either by hand or by means of a suitable device, with one preferably adjoining the other.

The fastening mechanisms are moved by hand or preferably, automatically, toward the inclined feeding end part by pushing, for example. Due to the inclination, they then slide along the feeding end part without requiring a separate drive. The pushing power of the following mechanism is independent of the total number in the feeding device, because the pieces, in a horizontal direction, do not take part in this insertion into the holding means. The fastening mechanism is properly aligned in the holding means relative to the lifting means, so that it can be immediately lifted without any additional operations, and be made to bear on the folder, etc., which has, in the meantime, been brought into the proper position. The horizontal feeding part is connected in a very expedient manner to preferably, an electrical jolter, which can be of any known type, and which moves the applied fastening mechanism toward the inclined feeding end part due to its jolting movements.

Another embodiment of the invention is characterized in that at least one magnet, preferably a permanent magnet, is arranged on the holding means for the fastening mechanism. It is assumed that the holding means consists of iron, at least with its part facing the magnet or magnets. The magnet or magnets ensure a proper alignment of the fastening mechanism in the holding means and provide the prerequisite for the correct takeover by the lifting means. The magnet(s) are preferably adjustable so that fastening mechanisms of different design can be used. The same holds true for the holding and lifting means.

According to another feature of the present invention, a centering pin belonging to the lifting means is assigned to each rivet hole of the fastening mechanisms in the holding means. During the working stroke, the centering pin enters a rivet hole of the fastening mechanism from the bottom. It can also be another hole, if necessary. In the case of a rivet hole, it is particularly advantageous if each centering pin is telescopically displaceable in a lifting element of the lifting means, with the free end of the lifting element supporting the fastening mechanism designed as a dolly. In this case, as many centering pins must be provided as rivets to be set, while in a different design, two centering pins are sufficient, despite the number of rivets. The folders, etc., and the ring mechanism are preferably fed in two directions, which are perpendicular to each other.

Accordingly, it is an object of the invention to provide a riveting device for joining a suspension or fastening device, particularly a ring mechanism, to a folder, which comprises, a holder for holding the folder which is arranged for example above support means for supporting the fastening device. The fastening device may be fed, for example, by a conveyor down into the holding means and it is located above a lifting element which rises upwardly with the fastening device to engage it with the folder positioned thereabove. A riveting head is arranged above the folder in a position to contact and drive a rivet through the folder and the fastening device to join them together.

Another object of the invention is to provide a device for riveting a folder and a fastening mechanism together which includes means for positioning the folder and the fastening means in superposed relationship and for moving one of them upwardly into engagement with the other below a riveting head which is then operated to drive a rivet downwardly through the two parts to join them together.

A further object of the present invention is to provide a method of riveting two parts together, with comprises, feeding one of the parts into a first plane of position and feeding the other part below the first part, raising the other part upwardly to the first part and driving a rivet through the two parts to join them together from one side of the two parts.

A still further object of the invention is to provide a device for riveting together a suspension or fastening device with a folder which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
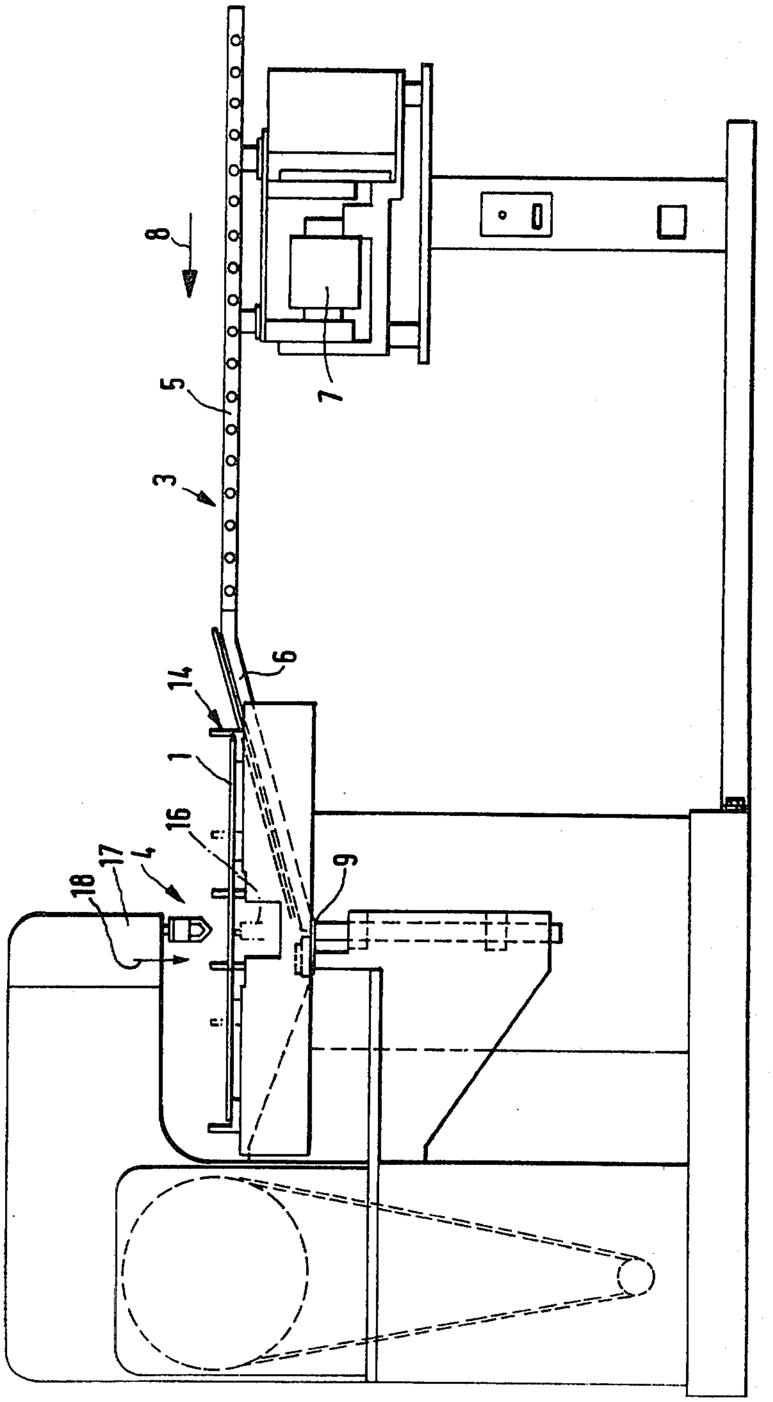
FIG. 1 is a schematic side elevational view of a device for riveting a suspension or fastening device, particularly, a ring mechanism, to a folder, constructed in accordance with the invention.

Referring to the drawings in particular, the invention embodied therein comprises a riveting device for joining a suspension or fastening device, particularly a ring binder mechanism 2, to a folder 1. The device comprises holder means in the form of a support 14 arranged below a riveting means, generally designated 4, which includes a rivet head 24 of a riveting machine 17 which operates in a downward direction, as indicated by the arrow 18, to pass a rivet through devices positioned therebelow, such as the folder 1, which is first aligned over the ring mechanism 2.

In accordance with the invention, one of the folder 1 or the ring mechanism 2 is fed or positioned so that it is aligned in vertical alignment with one superposed over the other and located above lifting means, generally designated 15. The lifting means is thereafter effective to raise the one of the two elements which is the lowest which, as shown, is the fastening mechanism 2, upwardly into engagement with the folder 1 so that the riveting head 24 may operate from the top thereof to drive a rivet through the two and to join them together.

Figure 2:
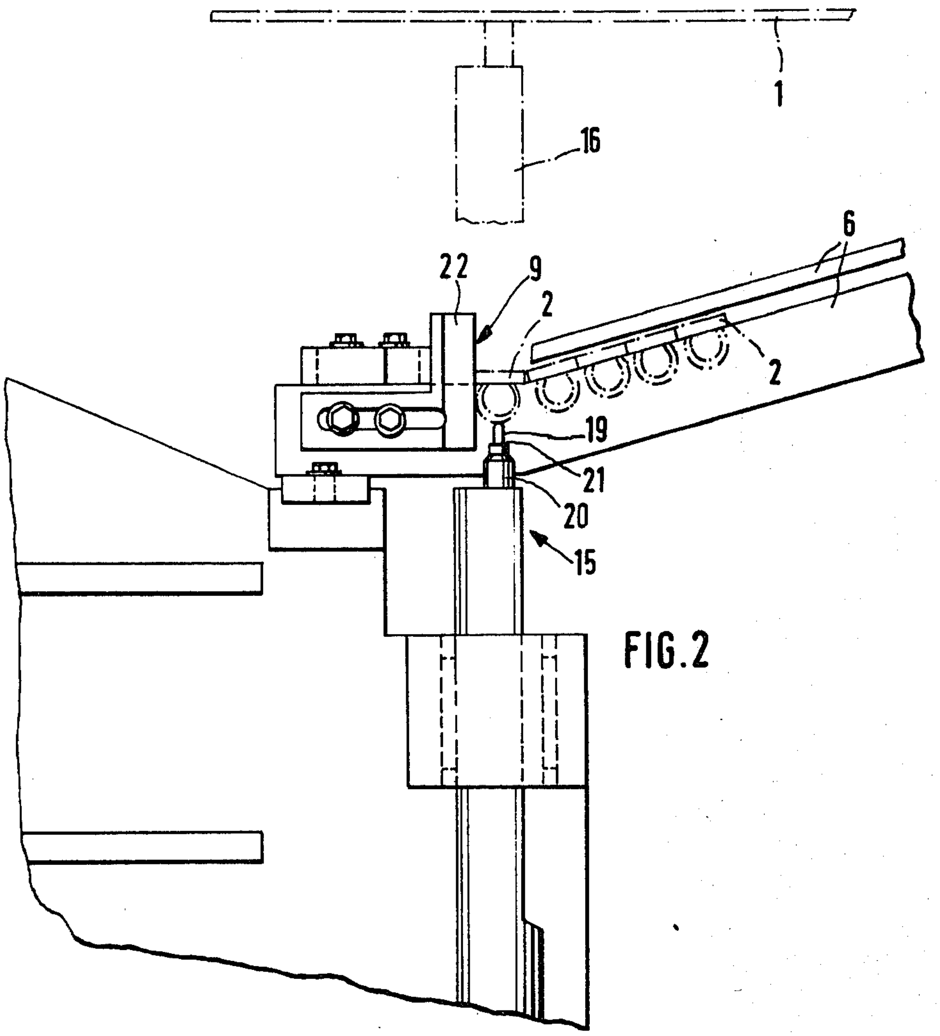
FIG. 2 is an enlarged side elevational view of a portion of the parts shown diagrammatically in FIG. 1.
Figure 3:
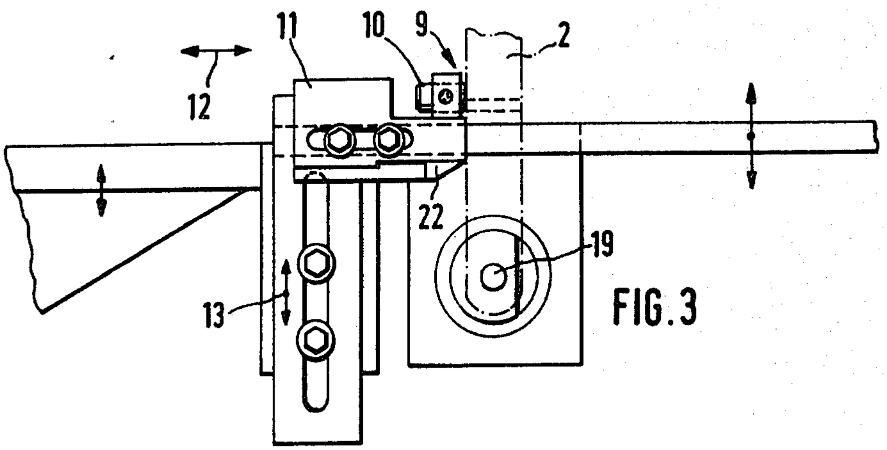
FIG. 3 is a top view of the mechanism shown in FIG. 2.
Figure 4:
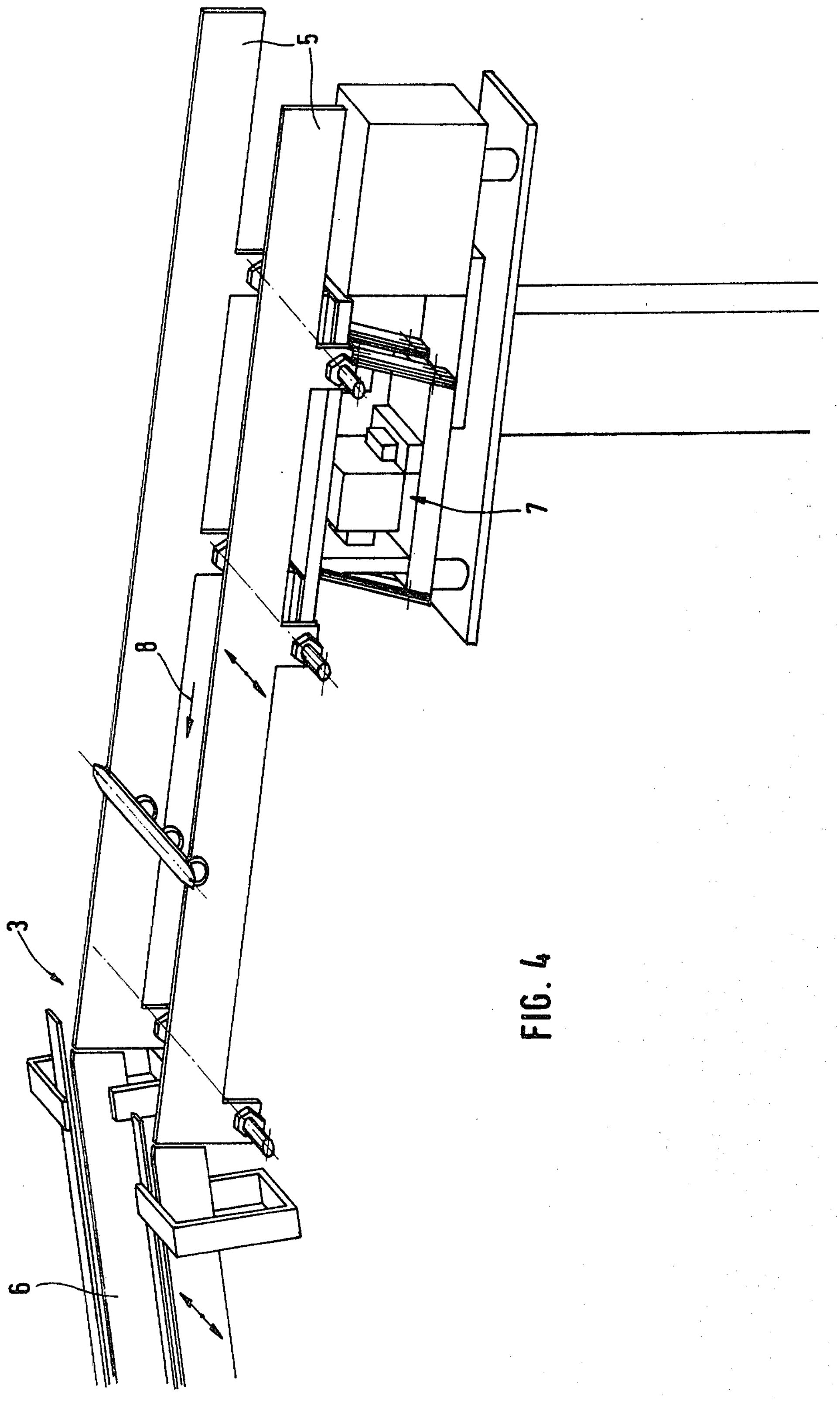
FIG. 4 is an enlarged detailed view in perspective of the embodiment of FIG. 1.
Figure 5:
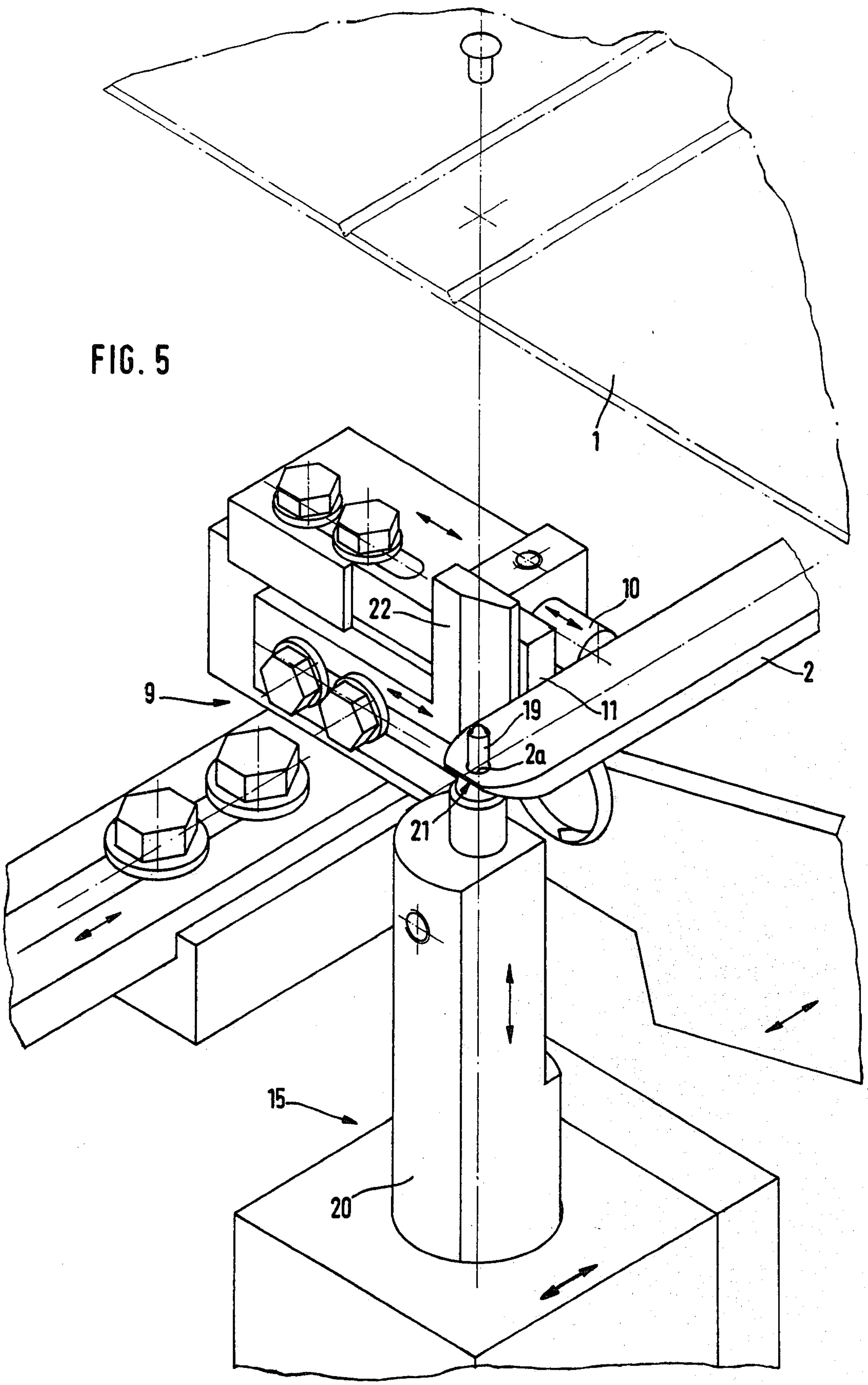
FIG. 5 is an enlarged detail of a portion of FIG. 1 with the folder 1 and rivet for holding it in exploded position.
Figure 6:
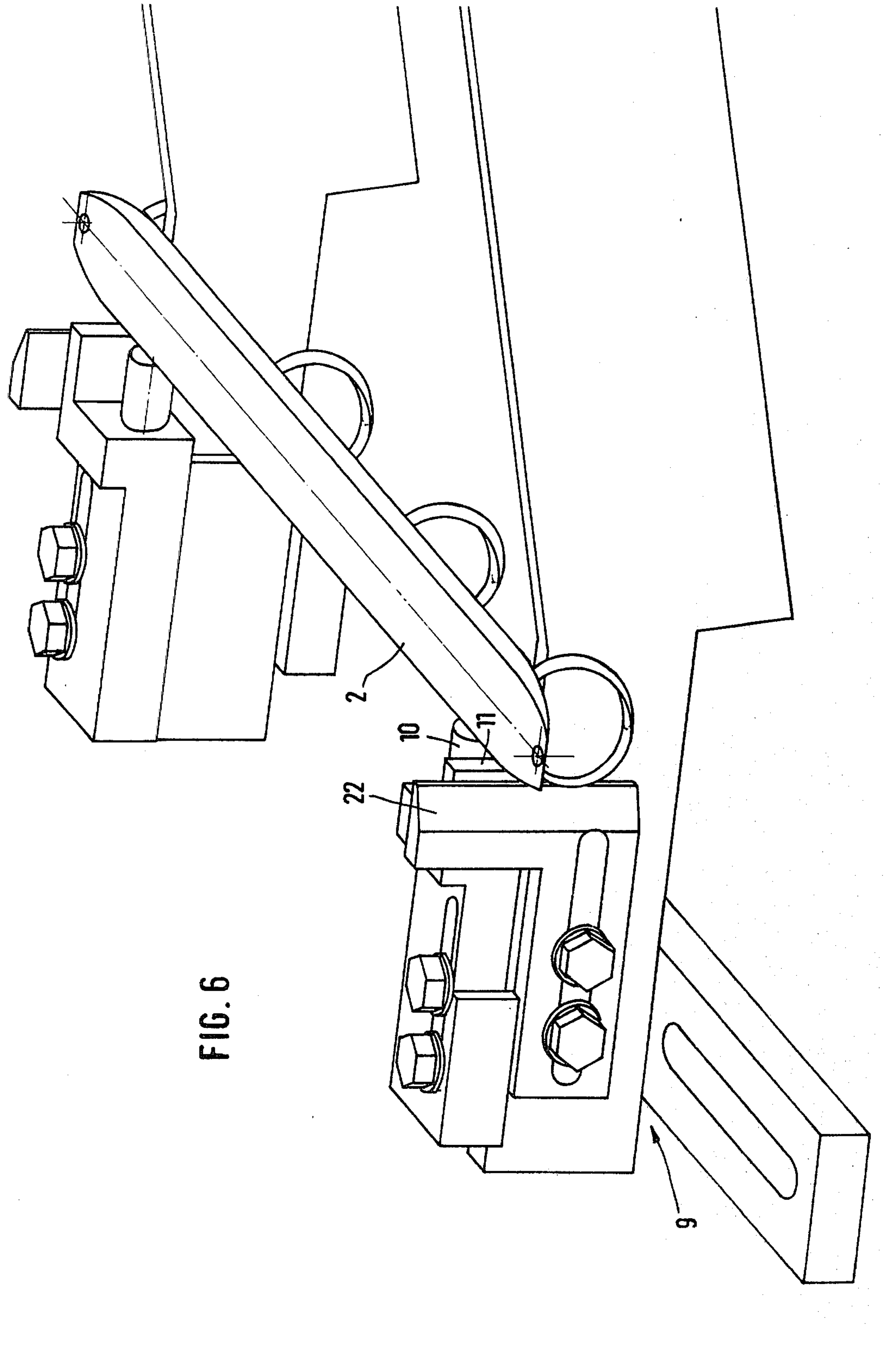
FIG. 6 is a Figure similar to FIG. 5 with the binder mechanism 2 shown supported on both ends.
Figure 7:
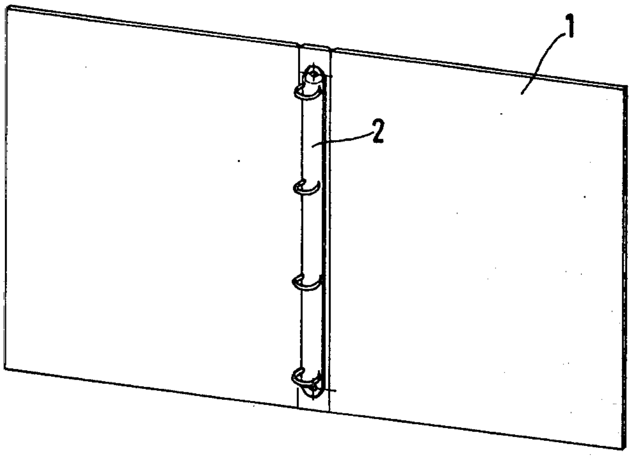
FIG. 7 is a perspective view of a folder with a binder mechanism showing.

The folders 1 are fed to the riveting device 24, perpendicularly to the operating plane of the rivet head as seen in FIG. 1 and in accordance with the invention. Folders 1 are fed to the folder holder 14, preferably from a magazine which has not been shown. The fastening mechanisms 2 to be riveted onto the folders (FIG. 2) are moved by a mechanism feeding device 3 to the riveting station 4. Feeding device 3 has a horizontal feeding part 5 and an adjoining downwardly inclined feeding end part 6. The fastening mechanisms 2 are engaged or positioned on feeding part 5, preferably by hand, with the rings down. A jolter or vibrator 7 moves the mechanisms 2 in the direction of arrow 8. As soon as they have reached feeding end part 6, they slide down solely by their own weight, until they finally arrive in their holding means 9. Two adjustable permanent magnets 10, arranged in a lateral distance, ensure the satisfactory alignment of the mechanisms 2 in holding means 9, where adjustable stops 11 are also provided. The adjustment of the stops 11 is effected in the directions of double arrow 12. In addition, an adjusting possibility exists transverse thereto, which is indicated by double arrow 13.

As soon as fastening mechanism 2 is aligned in its holding means 9 and the associated folder 1 is aligned in its holding means 14, lifting means 15 goes into action and lifts the lower fastening mechanism 2 to the level of folder 1. The upper end position of the lifting means 15 is indicated at 15' in FIGS. 1 and 2 by dot-dashed lines. When the upper end position is reached, the fastening mechanism bears on the underside of the folder 1 and the rivets can now be set in the direction of arrow 18 by means of rivet heads 24, whose number corresponds to the desired number of rivets. If hollow rivets are used, the necessary holes can be punched at the same time through folder 1. The lateral distance of the rivet heads and thus of the rivet or eyelet tools is preferably adjustable. Preferably, one or several driven threaded spindles are used, which cooperate with corresponding nuts of the rivet heads.

The essential feature of both the riveting device, according to the invention, and of the riveting method according to the invention, is the feeding of the fastening mechanisms on a lower plane than that of the folders, and the subsequent lifting of the fastening mechanisms and/or lowering of the folders, until they bear on each other. It is by no means necessary that the folders 1 are fed strictly horizontally and the fastening mechanisms along a curved, bent or inclined path. Decisive only is that the folder and the fastening mechanism to be attached thereon are one above the other after they have been aligned in their holding means. It is readily conceivable that the folder is arranged under the fastening mechanism after the lifting or lowering, and is riveted, for example, from the bottom, but the construction represented in the embodiment shown is preferable.

A centering pin 19 is assigned to each of two rivet holes 2*a* which are provided in the fastening mechanism aligned in the holding means. When the lifting means 15 rises, the pin 19 engages into the rivet hole 2*a* of the fastening mechanism 2 and thus prevents the lateral displacement of the fastening mechanism. Each centering pin 19 is mounted in a lifting element 20 in a spring-loaded telescope arrangement, into which it can be forced during the riveting. Preferably, the free end 21 of the lifting element supporting the fastening mechanism from the bottom is designed as a dolly. An additional stop 22, which is preferably adjustable, stabilizes the fastening mechanism in the holding means. With it, the rings of the ring mechanism bearing thereon are aligned relative to the centering pins 19.

When the lifting means 15 move down, after the riveting is completed, the folder connected with the fastening mechanism is removed, preferably automatically, and then the following folder is brought into the holding means. As soon as the lifting means is low enough, the next fastening mechanism slides into its holding means 9. Subsequently, the other operations of the above described cycle can be performed.

While a specific embodiment of the invention has been shown and described in detail to illustrate the application of the principles of the invention, it will be understood that the invention may be embodied otherwise without departing from such principles.

What is claimed is:

1. A method of riveting a fastening device to a folder, comprising, feeding said folder and said fastening device relatively into superposed aligned vertically spaced relationship, moving at least one of said fastening device and said folder relative to the other to position them in interengaged relationship, and applying a rivet from one side of said folder and said fastening device through said folder and said fastening device to interconnect them.

2. A method of riveting a fastening device to a folder, as claimed in claim 1, including moving both the folder and the fastening mechanism into a working range of a riveting device and then applying a rivet thereto.

3. A method of riveting a fastening device to a folder, as claimed in claim 1, wherein a rivet is applied to the fastening device and folder in order to form a hole therethrough.

* * * * *